Dec. 10, 1935.   J. COLL   2,023,409
SCISSOR RULE
Filed Aug. 22, 1934
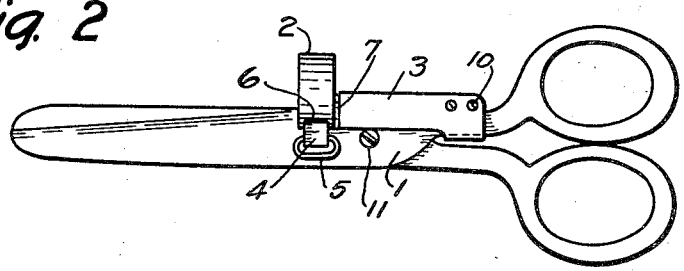
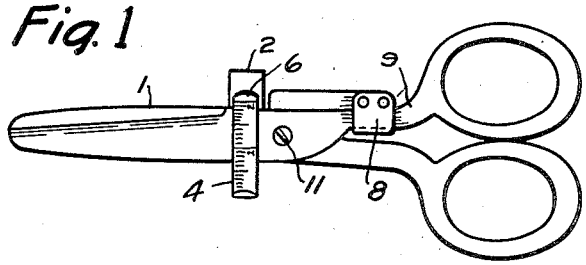
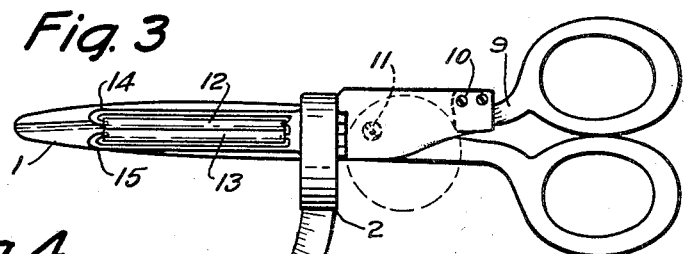
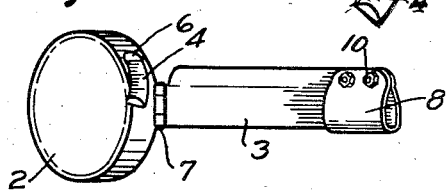
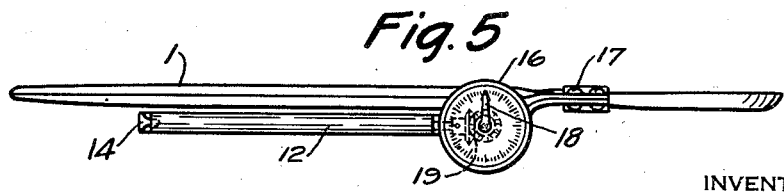
INVENTOR
Jean Coll
BY
James Harrison Bowen
ATTORNEY Patented Dec. 10, 1935

2,023,409

UNITED STATES PATENT OFFICE 2,023,409

SCISSOR RULE

Jean Coll, New York, N. Y.

Application August 22, 1934, Serial No. 740,917

8 Claims. (Cl. 164—80)

The purpose of this invention is to provide means attached to a pair of scissors by which material cut by the scissors may be measured.

The invention is a pair of scissors having a measuring device attached thereto and guiding means may also be used in combination therewith for guiding material thru the shears. Means may also be provided for indicating the amount of material drawn thru the shears, and this may be positioned at or on the shears. In cutting material in measured lengths with the scissors or shears, it is necessary to first measure off a length of material, mark or hold it at the measured point, and then cut it with the shears, and it is sometimes difficult to measure some materials accurately, and it is generally objectionable to mark the material; therefore, it has been found desirable to provide measuring means with the scissors so that the material may be drawn thru the scissors, and when the desired amount has passed the cutting point it may be cut. In cutting wide pieces of material, it is also desirable to hold the measure along the raw edge while cutting, so that the material will be the same length on both sides.

The object of the invention is, therefore, to provide means for measuring material so that the scissors may be held at an exact point when cutting the material to desired lengths.

Another object is to provide means on a pair of scissors which may readily be drawn from the scissors as the material passes therethru.

Another object is to provide a measuring device that may readily be attached to a pair of scissors.

Another object is to provide a measuring device adapted to be attached to a pair of scissors which may readily be removed and replaced.

A further object is to provide a measuring device adapted to be attached to a pair of scissors which is collapsible, so that it may be folded against the scissors.

And a still further object is to provide a measuring device adapted to be attached to a pair of scissors which is of a simple and economical construction.

With these ends in view the invention embodies a measuring device, means attaching the measuring device to a pair of scissors, and also rollers adapted to form a guide also adapted to be attached to the scissors in combination with the measuring device.

Other features and advantages of the invention will appear from the following description taken in connection with the drawing, wherein:

Figure 1 is a view showing a pair of scissors with an attachment having a measuring tape incorporated therein on the far side of the scissors with the attachment mounted upon the upper handle.

Figure 2 is a similar view showing an alternate design in which the attachment is mounted upon the same handle and located on the near side of the scissors.

Figure 3 is a similar view showing guide rollers in combination with the measuring tape.

Figure 4 is a detail showing the tape casing hinged to the attaching clip.

Figure 5 is a plan view showing an alternate design in which an indicating device is used in combination with the guide rollers to indicate the length of material passing thru the rollers.

In the drawing the device is shown as it may be made wherein numeral 1 indicates a pair of scissors, numeral 2 a casing for the measuring tape, and numeral 3 a clamp or clip by which the casing may be attached to the shank of a pair of scissors.

It will be understood that the scissors may be of any type, size or design, and scissors or shears adapted for any purpose may be used. In the design shown the device is attached to the upper shank of one of the scissor blades between the pivot and handle; however, it will be understood that the device may be attached to the lower shank, or to any point of the scissors, and may be attached or held to the scissors in any manner.

The casing 2 may also be of any type or design and may be of any size. It is preferred to use a comparatively small cylindrical shaped casing with a measuring tape 4 rolled and resiliently held therein, and the end of the tape may be provided with a clip 5, or any means by which it may be gripped and withdrawn from the casing, and which will also prevent the end of the tape being drawn into the casing when released. This tape extends thru an opening 6 in the casing, and it will be understood that the opening may be provided in the lower part of the casing in the design shown in Figure 2, or in the upper part, as in the design shown in Figure 2, or in any part thereof, and the casing may be positioned on either side of the scissors. The casing is hinged to the end of the clamp 3 by a hinge 7 so that it may fold against the side of the scissors, as indicated by the dotted lines shown in Figure 3; however, it will also be understood that the casing may be rigidly attached to the clamp or held thereto in any manner. At the end of the clamp 3 is a thin strap 8, which may be placed around the shank 9 of one of the scissor blades and held by screws 10 so that it may be rigidly clamped to the shank of the scissors. It will also be understood that this clamp may be held by rivets, pins, or may be welded or held in any manner. It will also be understood that the clamp may be secured to the scissors at any other point or points. It will be noted that the end of the clamp passes around the shank of the scissors and the flat portion thereof extends along one side of the scissors to a point beyond the pivot 11, so that the casing 2 may be positioned as close as possible to the shearing point between the blades as, with the blades open, material may be drawn therethru and with the end of the tape held at the end of the material, the tape may be drawn with the material so that, when the desired amount of material has been drawn thru the scissors, it may be cut, and the exact amount may, therefore, readily be determined.

In the design shown in Figure 3, rollers 12 and 13 are mounted on one side of the blades between springs 14 and 15, which extend outward from the clamp 3; however, it will be understood that these rollers may be mounted in any other manner, or held by any means. It will be noted that with the material passed between the rollers, they will rotate as the material is drawn thru the shears, thereby forming a guide for the material. These rollers may extend from the casing 2 to any point on the blades of the scissors, or may extend the full length, if desired. They may also be of any diameter, and may be held in any manner.

In the design shown in Figure 5 the casing 2 is replaced by an indicating device 16, which is mounted upon a clamp 17, similar to the clamp 3, and this device is provided with an arm 18 that may be operated by the rollers 12 and 13 thru gears 19, and it will be noted that as material is drawn between the rollers, they will rotate and, by proportioning the relative sizes of the gears, the arm 18 may move to indicate any desired amount of material drawn thru the scissors. It will be understood that this device may be mounted in any manner and may be connected to the rollers so that it may be operated thru the gears, as shown, or thru gears of any other type, or by any other operating means. It will also be understood that this device may be attached to the scissors in any other manner or may be made integral therewith, as may be desired.

It will be understood that other changes may be made in the construction without departing from the spirit of the invention. One of which changes may be in the use of other means for measuring instead of the tape or indicator, as shown, another may be in the use of other means for holding a measuring tape instead of the casing, as shown, another may be the use of other means for guiding the material thru the blades, and still another may be in the use of other means for mounting the guiding and measuring means upon the scissors.

The construction may readily be understood from the foregoing description. In use the device may be provided attached to shears or as an independent unit, and when it is desired to measure material to be cut, particularly such as ribbon, the device may be attached to the shank of the scissors by placing the clamp 3 around the shank between the screw and the handle, and with this device clamped in place, the end of the tape may be drawn out with the material, as hereinbefore described. The rollers may or may not be used, as may be desired, and it will be noted that any other measuring device may be used.

Having thus fully described the invention, what I claim as new and desire to secure by Letters Patent, is:

1. A tape holding attachment comprising a cylindrical casing having a spool with tape thereon mounted therein, a clamp to which said casing is hingedly attached, and a clip member on the end of said clamp, said attachment adapted to be clamped upon the shank of one of the handles of a pair of shears between the end of one of the blades and the handle, and said tape casing adapted to be positioned at right angles to the shears and with the tape adapted to pass over the shears.

2. A tape holding attachment comprising a tape housing and a clamp in which the housing is hinged to the clamp and the clamp adapted to be placed over and secured to the shank of a pair of scissors without requiring special construction of the scissors, said device positioning the tape above and at right angles to the cutting blades of the scissors, with the tape adapted to be drawn over the scissors with material drawn through the blades thereof, said housing also adapted to be folded against one of the sides of the scissors.

3. An attachment comprising tape holding means and means clamping said tape holding means to the shank of one of the handles of a pair of shears, said device positioning said tape holding means with the tape at right angles to the shears and adapted to be drawn across the shears with material drawn therethrough, said device also adapted to fold said tape holding means against the shears.

4. A device as described in claim 3 having guide rollers extending therefrom and positioned at one side of the shears and substantially parallel to one of the blades thereof.

5. A device as described in claim 3 having guide rollers extending therefrom and positioned at one side of the shears and substantially parallel to one of the blades thereof and means resiliently urging said guide rollers together.

6. An attachment adapted to be clamped to the handle of one of the blades of a pair of shears having guide rollers positioned substantially parallel to and adjacent the cutting edge of one of the blades of the shears, said rollers adapted to grip and hold material passing through the shears.

7. An attachment as described in claim 6 having resilient means urging the guide rollers together.

8. An attachment as described in claim 6 having measuring means adapted to measure the amount of material passing through the rollers.

JEAN COLL.